UNITED STATES PATENT OFFICE.

ALBERT B. CARR, OF ATLANTA, GEORGIA, ASSIGNOR TO THE PROCTER AND GAMBLE COMPANY, OF CINCINNATI, OHIO, A CORPORATION OF OHIO.

PROCESS OF TREATING COTTON-SEED.

1,141,104.  Specification of Letters Patent.  Patented June 1, 1915.

No Drawing.  Application filed July 24, 1913.  Serial No. 780,921.

*To all whom it may concern:*

Be it known that I, ALBERT B. CARR, a citizen of the United States, and a resident of Atlanta, county of Fulton, State of Georgia, have invented a new and useful Improvement in Processes of Treating Cotton-Seed, of which the following is a specification.

My invention relates to the process of treating cottonseed, and more particularly to the treatment of cottonseed for storage for subsequent manufacture or planting.

Cottonseed consists of a kernel composed of oil cells embedded in albuminous matter and inclosed in a tough, compact, substantially air-tight hull. Cottonseed is useful for many purposes and is now a well recognized food product. By far the greater bulk of the cottonseed after the lint has been removed, is shipped in wagons or carload lots to cottonseed oil mills where the unhulled seed is stored in quantities until it is run through the mills, where the hulls are removed, the oil pressed from the kernels, and the "meat" or remaining portion of the kernel ground into meal or flour or shipped elsewhere and there ground up. The oil in different forms is used very extensively as a food, and the flour or meal though largely used for feeding cattle, etc., is also used for cooking. When the raw seed is stored in bulk, it heats and decomposes, due, I believe, to fermentation of the raw albuminous matter; and because of this heating the seed which is purchased by the cottonseed mills and stored in great quantities, has to be carefully watched and when it shows a tendency to heat, it has to be either stirred or used at once. On account of this trouble, the mill people, who would prefer to purchase when the seed is good and plentiful and manufacture when the market is suitable, cannot hold the seed in storage for any length of time without danger of loss from heat and decomposition, and are therefore forced to market the seed at undesirable times, thus considerably reducing the profit of the mills. The same trouble is experienced by the farmer who has to sell his cottonseed as fast as his cotton is ginned, sometimes at a great sacrifice, or run the risk of the seed spoiling on his hands.

The principal object of my invention is to preserve the cottonseed for storage purposes without oxidizing the kernel or rendering it subject to dirt and insects, and preferably without materially impairing its germinating qualities.

Another object of the invention is to facilitate the subsequent milling of the cottonseed for the extraction of oil.

My invention in its broader aspects consists in partially coagulating the albuminous matter of the kernel while protecting the kernel from oxidization.

More specifically, the invention consists in heating the unhulled cottonseed to a temperature sufficient to partly cook or change the form of this albuminous matter to preserve it, and then cooling the unhulled seed to a temperature at which it may be safely stored in bulk, and if it is desired to manufacture oil from the seed, in hulling the seed in this cooled partly cooked state.

The invention not only permits of the seed being stored in bulk without heating, but it facilitates the milling of the seed in the manufacture of oil.

My invention may be carried out in various ways. The seed may be heated by passing heated air through it, or by conveying it through a heated chamber or putting it in a hot water or steam-jacketed receptacle and agitating it. The heated chamber or receptacle may be partially exhausted to produce a partial vacuum. The seed should be heated to a temperature sufficient to coagulate or partly cook the albuminous matter, and in the preferred form of the invention, I keep the temperature down to a point such as will not impair the germinating property of the seed. To obtain the best results the seed should be heated to a temperature of from 130° to 180°, and I prefer to heat the seed to between 130° and 160° if it is desired to retain the germinating quality of the seed, since there is danger of over-heating the seed for this purpose if the seed is heated about 160°. The seed may be cooled in any suitable manner, such as by stirring it in cooled rooms, spreading it in a cool atmosphere, or conveying it through cooled passages. In cooling the seed the temperature of the seed should not be carried below 32°, for it may damage the seed for some purposes, and I prefer not to carry the temperature of the seed in cooling below 40°. The seed should be cooled to a temperature such that it will not continue to cook or heat when it is subsequently stored, and to be safely stored it should be cooled to about 80°. If the seed is stored in a heated condition the air-tight hull inclosing the kernel will cause the seed to act somewhat like a fireless cooker, the hull retaining the heat of the kernel. When the cottonseed is treated in this manner it may be stored in bulk and kept for long periods without decomposing or heating. The seed thus treated is not oxidized as it would be if heated after it has been hulled. This oxidization is very detrimental, since it reduces the amount of oil that can be pressed from the kernel. Not only this, but if the hulls were removed the kernel would dry out and discolor to a greater extent when stored. By retaining the kernel in the hull it is kept clean and pure from contamination by dirt and insects during long intervals of storage and while it is being handled and conveyed to the mills for extracting the oil. Another advantage of retaining the hull is that the germinating quality of the seed is not impaired when thus treated. Seed which has been planted after being thus treated, has successfully germinated, producing a good stand, showing that the germinating property of the seed has apparently not been impaired. This is of importance, since it frequently happens that planters, for one reason or another, repurchase from the mills for planting a portion of the seed that they previously disposed of to the mills, and if the seed had been hulled or stored without being treated and had become decomposed, it would be unfit for planting purposes.

My process may be used by farmers as well as by the mills for treating cottonseed for storage until the planting season.

In the manufacture of cottonseed oil the raw unhulled seed is hulled, the kernel crushed and then cooked, and while hot, the oil is pressed out. By treating the unhulled seed according to my invention, the seed is more easily hulled, since the kernel has, by slight shrinkage as a result of the process, been loosened from the hull and the hull rendered more brittle. The time required in cooking the raw kernel for the purpose of pressing the oil out, is also reduced, since the seed has already been partially cooked by my process of treatment, and it is only necessary to heat it sufficiently to cause the oil to be expressed, and finally a purer and better grade of oil and other food products is obtained.

What I claim as new and desire to secure by Letters Patent, is:

1. The method of treating cottonseed to preserve it for storage in bulk, which consists in partially coagulating the albuminous substances of the kernel with the atmosphere excluded therefrom to prevent oxidization, and then cooling.

2. The method of treating cottonseed to preserve it for storage in bulk, which consists in heating the kernels to a temperature sufficient to partially cook or coagulate the albuminous matter with the kernels individually protected from the atmosphere, and then cooling them while still thus protected, to a temperature such as will not continue to cook or heat them when subsequently stored in bulk.

3. The method of treating cottonseed to preserve it for storage in bulk, which consists in heating the kernels to a temperature of 130° to 180° to partially cook the kernels with the kernels protected individually from the atmosphere, and then cooling them while still thus protected, to a temperature of 80° to 40°.

4. The method of treating cottonseed to preserve it for storage in bulk for subsequent manufacture of food products or for planting, which consists in heating the kernels to a temperature sufficient to partly cook them without destroying their germinating quality with the kernels protected individually from the atmosphere, and then cooling them while still thus protected, to a temperature such as will not continue to cook or heat them when subsequently stored in bulk and which will not destroy their germinating quality.

5. The method of treating cottonseed to facilitate the manufacture and enhance the value of food products therefrom, which consists in heating the kernels while retaining them in their hulls, to a temperature sufficient to partially cook them, and then cooling them in their unhulled condition to a temperature not sufficient to continue to cook or heat them when subsequently stored in bulk.

6. The method of treating cottonseed preliminary to the manufacture of food products therefrom, which consists in heating the kernels while retaining them in their hulls, to a temperature sufficient to partially cook them, then cooling them, and then hulling them at the time of manufacture, whereby the hulling process and the subsequent extraction of the oil is facilitated and the resulting food product improved.

In testimony whereof, I have signed my name to this specification, in the presence of two subscribing witnesses.

ALBERT B. CARR.

Witnesses:
 E. C. AINSLIE,
 C. I. MOTTE.